United States Patent
Rosenkvist (10) Patent No.: US 9,940,802 B2
(45) Date of Patent: Apr. 10, 2018

(54) MOUNTING ASSEMBLY

(71) Applicant: Axis AB, Lund (SE)

(72) Inventor: Alexander Rosenkvist, Sjobo (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/584,220

(22) Filed: May 2, 2017

(65) Prior Publication Data

US 2017/0337789 A1    Nov. 23, 2017

(30) Foreign Application Priority Data

May 20, 2016  (EP) .................................... 16170526

(51) Int. Cl.
| | |
|---|---|
| *G03B 17/56* | (2006.01) |
| *F16M 13/02* | (2006.01) |
| *G08B 13/196* | (2006.01) |
| *G03B 17/00* | (2006.01) |
| *E05B 9/08* | (2006.01) |
| *H04N 7/18* | (2006.01) |

(52) U.S. Cl.
CPC ..... *G08B 13/19632* (2013.01); *G03B 17/561* (2013.01); *E05B 9/08* (2013.01); *G03B 17/00* (2013.01); *H04N 7/18* (2013.01)

(58) Field of Classification Search
None
See application file for complete search history.

(56) References Cited

U.S. PATENT DOCUMENTS

| | | |
|---|---|---|
| 4,073,454 A | 2/1978 | Sauber |
| 4,830,542 A | 5/1989 | Bunnell et al. |
| 5,649,256 A | 7/1997 | Wen |
| 5,697,588 A | 12/1997 | Gonzalez et al. |
| 5,790,190 A * | 8/1998 | Mogamiya ............. H04N 9/093 348/263 |
| 8,998,512 B1 * | 4/2015 | Celler .................. G03B 17/561 396/427 |

(Continued)

FOREIGN PATENT DOCUMENTS

| | | |
|---|---|---|
| JP | 2007-278384 | 10/2007 |
| WO | WO 2014/170467 A1 | 10/2014 |

OTHER PUBLICATIONS

European Search Report (with Written Opinion) dated Dec. 6, 2016 in European Application 16170526.4 filed on May 20, 2016.

*Primary Examiner* — W B Perkey
(74) *Attorney, Agent, or Firm* — Oblon, McClelland, Maier & Neustadt, L.L.P.

(57) ABSTRACT

A mounting assembly (10) for an electronic device (11) is disclosed. The mounting assembly (10) comprises an attachment part (12), a base (16), and an arm (14). The attachment part (12) is coupled to the arm (14) and the arm (14) is coupled to the base (16) such that the arm (14) is lockingly rotatable relative the base (16) about a rotational axis (18). The arm (14) comprises a housing and a locking member (20) being provided with a locking protrusion (30). The locking member (20) is coupled to the housing such that the locking protrusion (30) is radially displaceable in relation to the rotational axis (18). The base (16) is provided with a set of radially extending locking grooves (22). The locking protrusion (30) is received by one locking groove (22a) in response to a displacement of the locking member (20), whereby the arm (16) is rotationally locked.

15 Claims, 5 Drawing Sheets

(56) References Cited

U.S. PATENT DOCUMENTS

| | | |
|---|---|---|
| 2005/0001116 A1 | 1/2005 | Vogt |
| 2006/0255227 A1 | 11/2006 | Rand et al. |
| 2007/0165137 A1* | 7/2007 | Lai ................. F16M 11/08 348/375 |
| 2008/0251675 A1 | 10/2008 | Amato et al. |
| 2010/0059650 A1* | 3/2010 | Kaneko ............. F16M 11/10 248/372.1 |
| 2010/0237206 A1* | 9/2010 | Barker ............. F16M 11/041 248/206.5 |
| 2011/0174937 A1 | 7/2011 | Sullivan |
| 2015/0139635 A1* | 5/2015 | Lellky ............. G03B 17/561 396/427 |
| 2015/0198867 A1 | 7/2015 | Celler |
| 2016/0081207 A1 | 3/2016 | Broadbent et al. |
| 2017/0269460 A1* | 9/2017 | Fagerkvist ......... F16C 11/06 |
| 2017/0337789 A1* | 11/2017 | Rosenkvist ...... G08B 13/19632 |

* cited by examiner

MOUNTING ASSEMBLY

TECHNICAL FIELD

The invention relates to a mounting assembly for an electronic device. Specifically, the invention relates to the arrangement of an attachment part, an arm and a base of the mounting assembly.

BACKGROUND OF THE INVENTION

A mounting assembly can be provided for many different types of devices. This patent application relates to a mounting assembly provided for an electronic device. The electronic device is attached to an attachment part of the mounting assembly. The attachment part is in turn coupled to an arm which in turn is coupled to a base. The base may be arranged on, and optionally fastened to, a surface such as a wall, table or a ceiling. The mounting assembly may be arranged for allowing the attachment part, and thus the electronic device attached thereto, to be moved relative the arm by for example a tilt and/or a rotational movement. Additionally, the arm can be arranged to be rotationally movable relative the base.

The mounting assembly may be constructed to provide a locking of the movement of its parts relative each other, i.e. the arm relative the base and the attachment part, respectively. One type of locking construction is to utilize friction force created in the interface between parts, such as in the interface between the arm and the base. In order to lock the rotational movement of the arm in relation to the base, the mounting assembly may be arranged such that a part of the arm is forced against a part of the base so as to create a tight arrangement. The resulting friction force created by the tight arrangement counteracts movement of the arm in relation to the base. Thus, a rotational movement of the arm in relation to the base may be restricted.

One problem with this type of arrangement is that the tight arrangement of the parts may need to be made very strong in order to achieve a sufficient friction force. Such a tight arrangement may be difficult to achieve and there is a risk that the arrangement come loose over time. This may be a difficult problem to overcome when using certain types of sleek materials of the parts. Metal is an example of such a material. Metal may be a desired material in some constructions for providing a good resistance against both internal and external forces.

A solution to this problem is to provide a friction-increasing material, such as glue material or a friction coating, in the interface between the parts. The friction-increasing material may increase the ratio between the created friction force and how tight the tight arrangement between the parts must be in order to achieve such a friction force.

A problem with friction-increasing materials is that they may be difficult to apply to certain material surfaces and a high level of quality control may be required. Moreover, the friction-increasing material may wear off over time which is difficult to both discover and take care of since the interface is typically not visible without disassembling the mounting assembly.

In addition, in mounting assemblies where it is desirable to provide a conducting path between the arm and the base, to for example fulfill EMC regulations, the friction-inducing material provides an undesired nonconductive barrier which may obstruct the conducting path.

Hence, there is a need for an improved mounting assembly. Specifically, there is a need for an improved locking mechanism between the arm and the base of such a mounting assembly.

Additionally, a cable of the electronic device attached to the attachment part may be arranged to extend through the parts of the mounting assembly, i.e. through the attachment part, the arm, and the base. In such an arrangement, it may be desirable to limit the rotational movement of the parts relative each other. An unlimited rotational movement of the parts relative each other may cause a problem in that the cable may be twisted beyond function, be sheared off, or a continuous rotation may dislodge connectors thereof.

SUMMARY OF THE INVENTION

It is an object of the present invention to provide a mounting assembly for an electronic device, wherein an arm of the mounting assembly is lockable relative a base of the mounting assembly in an improved manner. It is a further object of the present invention to provide a locking mechanism that is robust and strong without requiring unreasonable high level of tightening and preferably being independent of the materials used in the mounting assembly.

It is a further object of the present invention to provide a locking mechanism that can be combined with the usage of conductive materials of the parts to be locked for achieving a conductive path through the construction.

According to a first aspect, the above and other objects that will be evident from the following description are achieved by a mounting assembly for an electronic device according to claim 1. The mounting assembly comprises an attachment part arranged to be attached to the electronic device; a base arranged to be attached to a mounting surface; and an arm via which the attachment part is connected to the base. The attachment part is coupled to the arm such that the attachment part is lockingly tiltable relative the arm. The arm is coupled to the base such that the arm is lockingly rotatable relative the base about a rotational axis that is parallel with a longitudinal axis of the arm. The arm comprises a housing; and a locking member arranged inside the housing and being provided with a locking protrusion. The locking member is coupled to the housing via an adjustment element such that the locking member is displaceable relative the housing, and such that the locking protrusion is radially displaceable in relation to the rotational axis, by adjusting said adjustment member. The base is provided with a set of radially extending locking grooves in relation to the rotational axis. The mounting assembly is arranged such that the locking protrusion is received by one locking groove in the set of locking grooves in response to a displacement of the locking member, and thus a radial displacement of the locking protrusion, relative the housing, whereby the arm is rotationally locked in relation to the base.

Accordingly, the locking member is displaceable relative the housing for adjustment between a locked mode and an unlocked mode in view of rotational movement of the arm relative the base. The locking protrusion is arranged on the locking member such that the locking protrusion is radially displaced in view of the rotational axis when the locking member is displaced. Moreover, the mounting assembly is arranged such that when the locking member is displaced relative the housing, and thus the locking protrusion is radially displaced relative the rotational axis, the locking protrusion of the locking member slides into and is received by a locking groove of the base. By that the locking grooves extends radially, a rotational movement of the locking member, and thus the arm, is prevented when the locking protrusion is received in any of the locking grooves.

The inventive locking mechanism provided for rotationally locking the arm in relation to the base at least reduces the need for friction-induced materials in the interface between the arm and the base. By that a mechanical lock is provided, a higher level of stability and robustness of the mounting assembly is achieved by that the locking mechanism does not solely rely on a friction force provided by the friction-induced material. The inventive construction may also become more resistant to wear.

It is appreciated that the rotational movement of the arm in relation to the base does not need to be fully locked in order to benefit from the above advantages. In fact, a typical configuration of the mounting assembly may enable a small rotational movement even in the locked mode, due to a difference in dimensions of the locking protrusion and the locking groove in which the locking protrusion is received.

A further advantage is that the locking mechanism is combinable with the usage of conductive materials for providing a conductive path between the arm and the base. For example, the locking member, (parts of) the base and (parts of) the adjustment member may be made in a conductive material, such as steel, for providing a conductive path between the adjustment member and (parts of) the base.

The locking protrusion may be provided on a surface of the locking member facing the base.

The set of locking grooves of the base may be arranged as a circular array of radially extending grooves.

The set of locking grooves may be connected by a guiding groove arranged to receive the locking protrusion.

The mounting assembly may be arranged such that a joint member of the attachment part is positionally locked in relation to the arm in response to the displacement of the locking member relative the housing.

The mounting assembly may be arranged such that the joint member is positionally locked relative the arm by clamping the joint member between a wedge member and the housing of the arm. The wedge member may be arranged inside the housing. Abutting surface portions of the locking member and of the wedge member may be inclined such that the wedge member is forced towards the joint member in response to the displacement of the locking member relative the housing for clamping the joint member.

The attachment part may be coupled to the arm such that the attachment part is also lockingly rotatable relative the arm.

The attachment part may be coupled to the arm via a ball joint. A ball joint typically allows both tilt movement and rotational movement.

The radial displacement of the locking protrusion may be defined as a radial outwards displacement in relation to the rotational axis.

The adjustment element may be a screw. The screw may be arranged to be accessible from outside the housing for adjustment.

The locking member may be provided with an additional locking protrusion. The locking member may be coupled to the housing via the adjustment element such that the locking member is displaceable relative the housing, and such that the additional locking protrusion is radially displaceable in relation to the rotational axis, by adjusting said adjustment member. The base may be provided with an additional set of radially extending locking grooves in relation to the rotational axis. The mounting assembly may be arranged such that the additional locking protrusion is received by one additional locking groove in the additional the set of locking grooves in response to a displacement of the locking member, and thus a radial displacement of the additional locking protrusion, relative the housing.

By utilizing a plurality of locking protrusions, each being arranged to be received in a locking groove, the construction may become more resistant against rotational forces. This exemplified construction may be beneficial for mounting assemblies of larger dimensions.

The locking element may be made of a conductive material such as metal.

The mounting assembly may further comprise a rotation stop member arranged to limit the rotational movement of the arm relative the base. The rotational movement is preferably limited to slightly more than 360 degrees, i.e. a bit more than a full turn.

The attachment part may be lockingly tiltable relative the arm in a range of about 90 degrees. In combination with allowing a rotational movement of the arm in relation to the base, preferably slightly more than one turn, a wide range of possible positions of the electronic device is allowed.

The electronic device may be a monitoring camera, a thermal sensor, a door station, or a speaker.

According to a second aspect, the invention relates to a system comprising an electronic device and a mounting assembly according to an embodiment of the first aspect. The above disclosed examples of configurations of the mounting assembly apply to the mounting assembly of the system as well.

Generally, all terms used in the claims are to be interpreted according to their ordinary meaning in the technical field, unless explicitly defined otherwise herein. All references to "a/an/the [element, device, component, means, etc]" are to be interpreted openly as referring to at least one instance of said element, device, component, means, etc., unless explicitly stated otherwise.

BRIEF DESCRIPTION OF DRAWINGS

The above disclosed and other aspects of the present invention will now be described in more detail, with reference to the appended drawings showing embodiments of the invention.

DETAILED DESCRIPTION

The present invention will now be described more fully with reference to the accompanying drawings, in which currently preferred embodiments of the invention are shown. The invention may however be embodied in many different forms and should not be construed as limited to the embodiments set forth herein.

Figure 1:
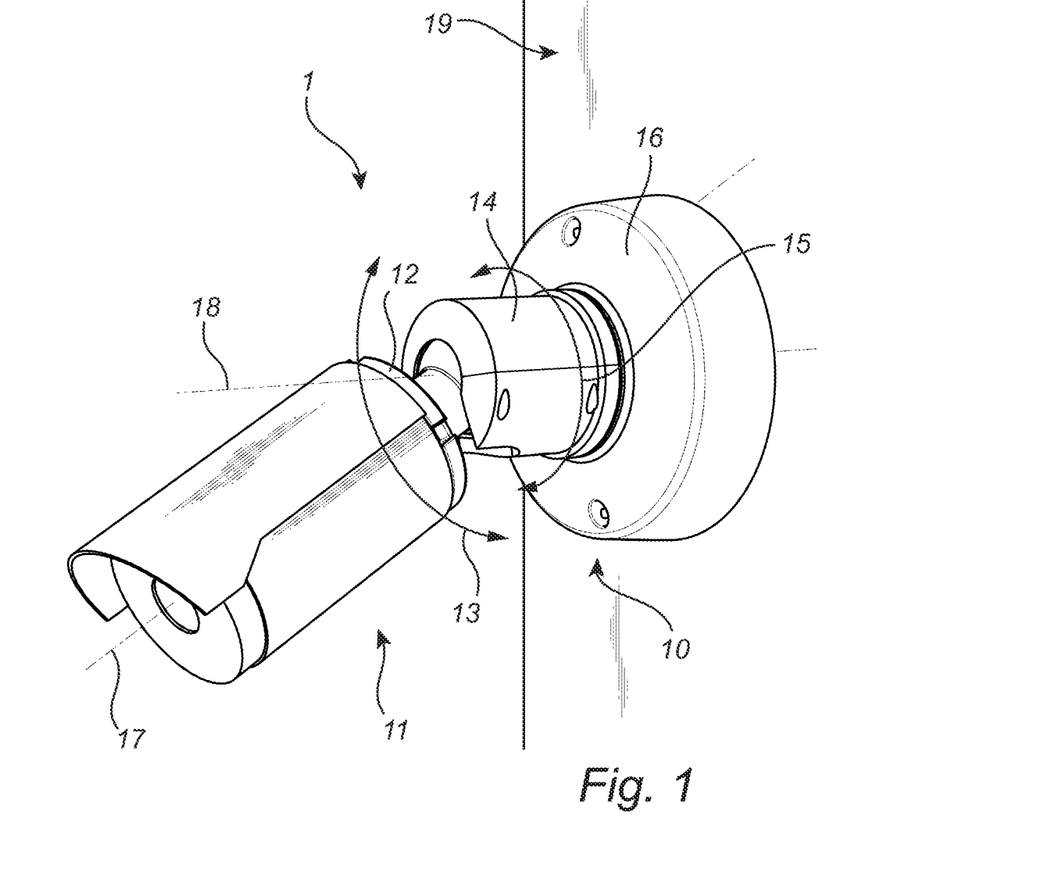
FIG. 1 illustrates a system comprising a monitoring camera and a mounting assembly attached to a surface.

FIG. 1 illustrates a system 1 comprising an electronic device, in the form of a monitoring camera 11, and a mounting assembly 10. The monitoring camera 11 may comprise a visual or a thermal sensor for capturing visual or thermal images of a monitored scene.

The mounting assembly 10 comprises a first part in the form of an attachment part 12, a second part in the form of an arm 14, and a third part in the form of a base 16. The monitoring camera 11 is attached to the attachment part 12 by screws or the like. A purpose of the construction of the mounting assembly 10 is to enable mounting of the electronic device, in this case the monitoring camera 11, to a surface 19. The surface 19 is in this example a wall, but could be a differently oriented surface such as a ceiling. Another purpose of the construction of the mounting assembly 10 is to enable setting and adjusting the position of the electronic device attached thereto. For this purpose and in the illustrated embodiment, the attachment part 12 is coupled to the arm 14 such that the attachment part 12 is lockingly tiltable relative the arm 14. The attachment part 12, and the thereto attached monitoring camera 11, is thus allowed to tilt relative the arm 14 as indicated by 13. In this embodiment, the attachment part 12 is allowed to tilt in an interval of 0 to about 90 degrees.

The mounting assembly 10 is in this embodiment further arranged such that the attachment part 12, and thus also the monitoring camera 11, is allowed to rotate around a longitudinal axis 17 of the attachment part 12. The attachment part 12 is coupled to the arm 14 by means of a ball joint for enabling both tilt and rotational movements of the attachment part 12 in relation to the arm 14. Other types of joints may be utilized in the mounting assembly 10 for enabling a desired movement mechanism of the attachment part 12 in relation to the arm 14.

The arm 14 is coupled to the base 16 such that the arm 14 is lockingly rotatable relative the base 16 about a rotational axis 18. The arm 14 is thus allowed to rotate relative the base 16 as indicated by 15. The rotational axis 18 is parallel with a longitudinal axis of the arm 14, and in the illustrated example these axes coincide.

By that the movements of the attachment part 12, the arm 14, and the base 15 in relation to each other are lockingly arranged is meant that the mounting assembly 10 may be arranged so as to lock the possibility to move one or more of these parts relative each other. The respective movement of the attachment part 12 in relation to the arm 14 and of the arm 14 in relation to the base 16 may be locked by different locking mechanisms of the mounting assembly 10. In the illustrated embodiment, one common locking mechanism is however arranged for locking both movements. This common locking mechanism will now be disclosed in detail with further reference to FIG. 2.

Figure 2:
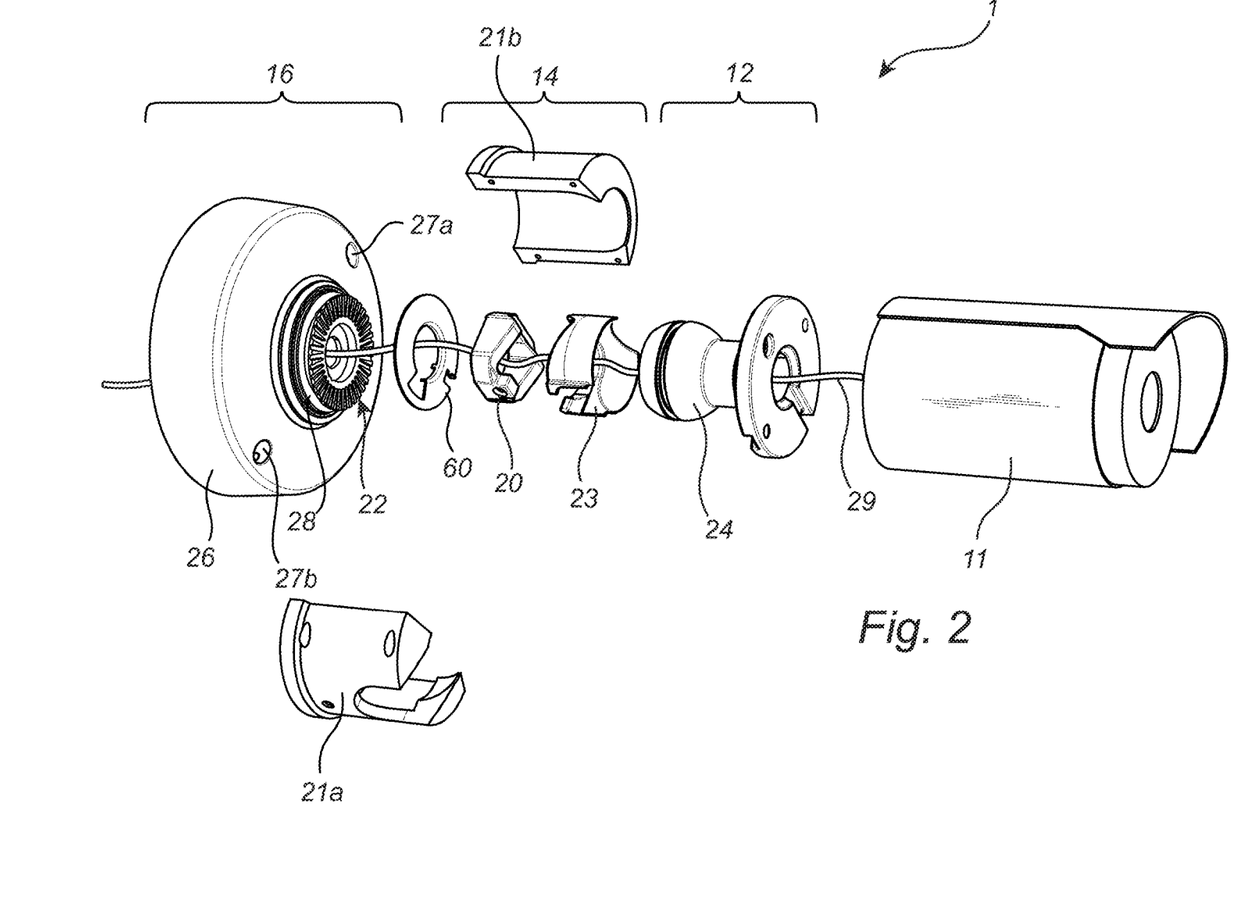
FIG. 2 illustrates the system in an exploded view.

The system 1 is illustrated in an exploded view in FIG. 2. A cable 29 for connecting the monitoring camera 11 to, for example, a power supply is arranged through the mounting assembly 10. The mounting assembly 10 may be arranged with a rotation stop mechanism in the joint between the attachment part 12 and the arm 14 for limiting the rotational movement of these parts relative each other for preventing twisting of the cable 29.

The arm 14 comprises a housing which in this embodiment is formed by a first housing section 21a and a second housing section 21b. When joined, the first and second housing sections 21a, 21b form a housing having an overall cylindrical shape. Inside (within) the formed housing, a locking member 20 is arranged. The locking member 20 is arranged at one end of the housing. A lower surface of the locking member 20 faces towards the base 16.

A wedge member 23 is also arranged inside (within) the housing. The wedge member 23 abuts the locking member 20.

At the other end of the housing, a joint member of the attachment part 12 is arranged. The joint member is in this embodiment formed by a ball 24 being part of the ball joint which couples the attachment part 12 to the arm 14. The wedge member 23 and the housing sections 21a, 21b are arranged to form a ball socket for receiving the ball 24 and for preventing removal of the ball 24 when arranged in the ball socket.

The base 16 comprises a plate member 26 which is provided with holes 27a, 27b for attaching the base 16 to the surface 19.

The base 16 further comprises a groove member 28. The groove member 28 is in this embodiment formed together with the plate member 26. The groove member 28 and the plate member 26 may for instance be casted or molded together. In other embodiments, the groove member 28 may form a separate part. A rotation stop member 60 is provided for enabling a rotation stop function of the arm 14 in relation to the base 16. The design and function of the rotation stop member 60 will be explained in detail in connection to FIG. 5.

Returning to FIG. 2, the groove member 28 is provided with a set of locking grooves 22. The set of locking grooves 22 are arranged as a circular array. The locking grooves 22 are provided to extend radially in view of the rotational axis 18 of the arm 14, when the mounting assembly 10 is assembled.

The housing sections 21a, 21b are arranged to engage with a part of the base, when the housing sections 21a, 21b are joined to form the housing, such that the arm 14 is rotationally fixed to the base 16. In other words, the mounting assembly 10 is arranged such that the arm 14 is fixed in view of movement along the longitudinal axis of the arm 14. This attachment may be achieved by different constructions of the arm and the base which are known and achievable for the skilled person.

Figure 3:
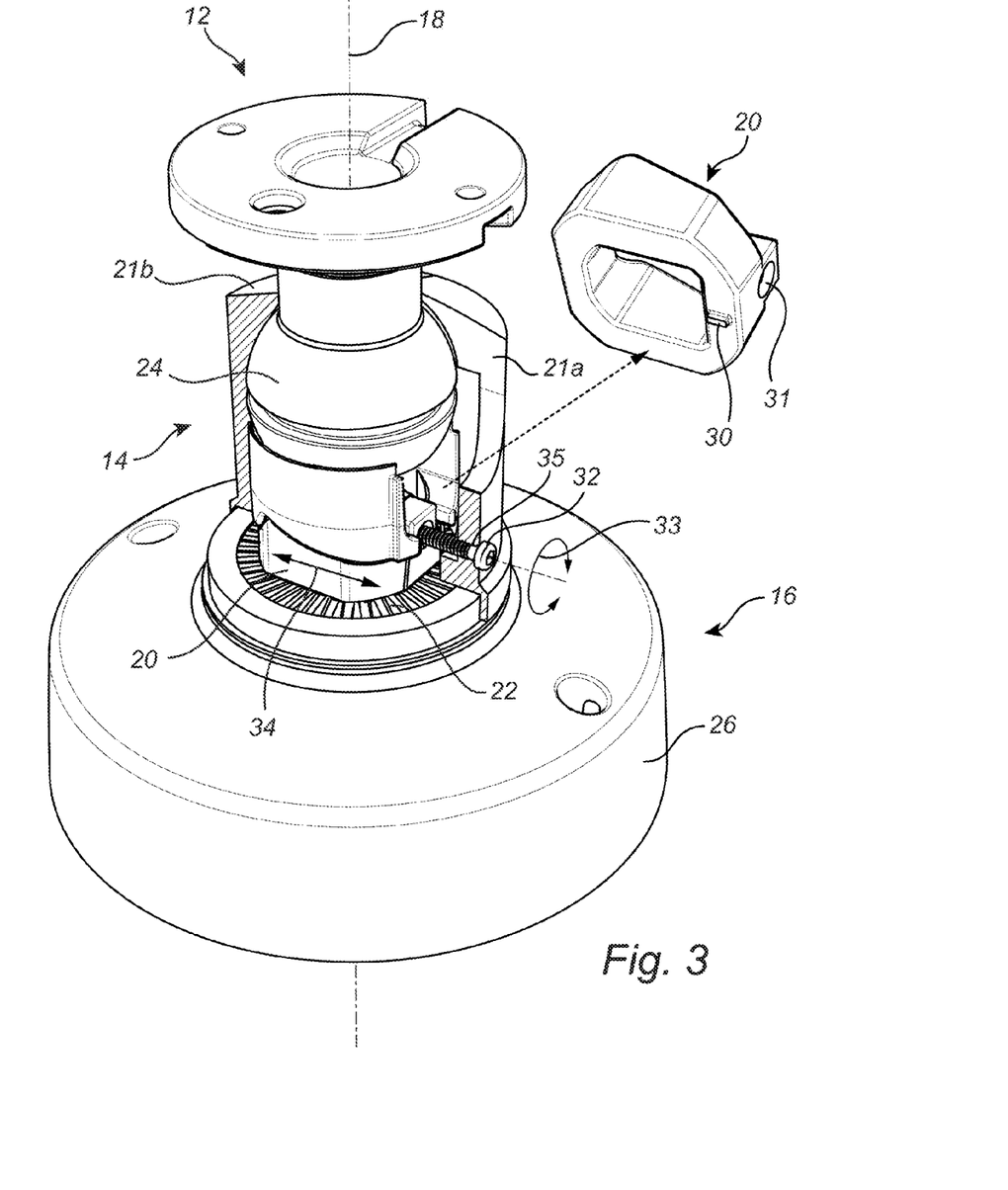
FIG. 3 illustrates a configuration of parts of the mounting assembly.

Going more into detail, the function of the locking mechanism of the mounting assembly 10 will now be explained with further reference to FIGS. 3, 4a, and 4b. The rotation stop member 60 is not illustrated in these figures in order to facilitate the understanding of the disclosed functions.

Firstly, the locking of the arm 14 in relation to the base 16 will now be disclosed. The locking is provided by an interaction between the locking member 20 and the groove member 28. For this purpose, the locking member 20 is provided with a locking protrusion 30. The locking protrusion 30 is in this embodiment provided on a surface which faces the groove member 28 and thus the base 16.

The locking member 20 is arranged to be coupled to the housing, and in this embodiment to the first housing section 21a. The coupling is provided by an adjustment member in the form of a screw 32 which may be adjusted as indicated by 33. The screw 33 is arranged to be accessible from outside the housing whereby adjustment can be performed without disassembling the mounting assembly.

The screw 32 is arranged through a hole 35 of the housing section 21a and further through a threaded hole 31 of the locking member 20. The screw 32 is provided for adjusting the position of the locking member 20 in relation to the housing, and in this embodiment in relation to the first housing section 21a. Specifically, the position of the locking protrusion 30 as seen in a radial direction to the rotational axis 18, which in this embodiment is the same as the longitudinal axis of the housing and the arm, is made adjustable by the screw 32. In other words, the locking member 20 is displaceable relative the housing, and thereby the locking protrusion 30 is radially displaceable in relation to the rotational axis 18, by adjustment of the screw 32. The displacement of the locking member 20 is indicated by 34.

Figure 4A:
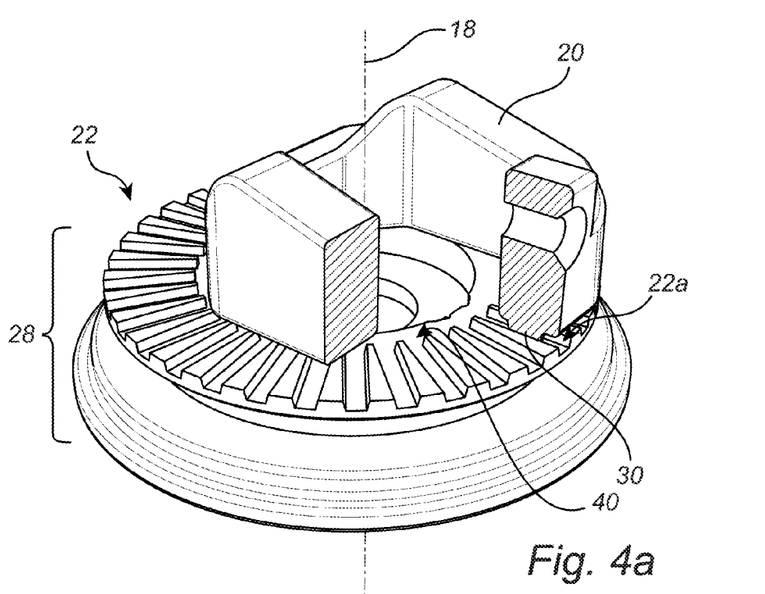
FIGS. 4a and 4b illustrate different positions for a locking member relative a set of locking grooves, both being part of the mounting assembly.
Figure 4B:
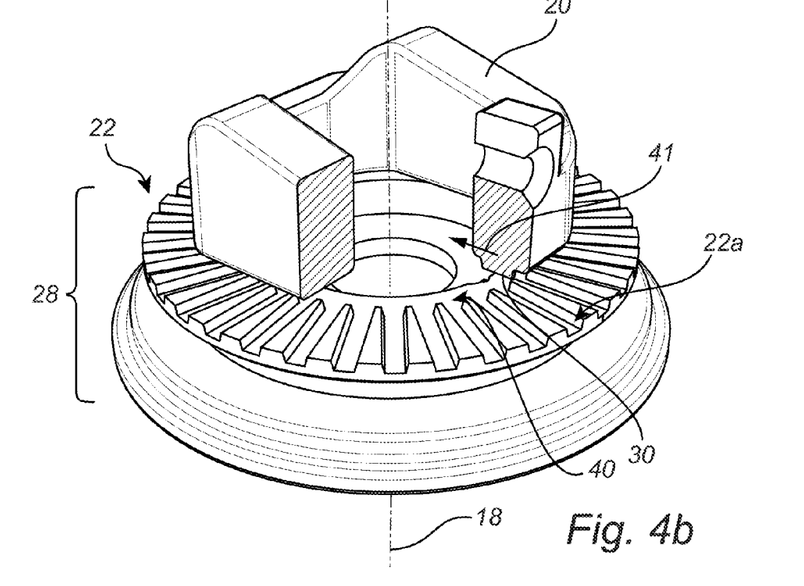

The interaction between the locking member 20 and the groove member 28 is illustrated in FIGS. 4a and 4b. In FIG. 4a, the locking protrusion 30 has been displaced radially outwards from the rotational axis 18, and thus towards the housing, such that the locking protrusion 30 is received by one locking groove 22a in the set of locking grooves 22. The displacement of the locking protrusion 30 is achieved by adjustment of the locking member's 20 position relative the housing by means of the screw 32 as previously disclosed. With the locking protrusion 30 in this position, a locked mode of the arm 14 in relation to the base 16 is achieved. In FIG. 4b, the locking protrusion 30 has been radially displaced inwards towards the rotational axis 18, as indicated by 41. With the locking protrusion 30 in this position, an unlocked mode of the arm 14 in relation to the base 16 is achieved. In this position, the locking member 20, and thus the arm 14, is allowed to rotate in relation to the base 16. The locking protrusion 30 is in this unlocked mode received in a guiding groove 40 of the groove member 28. The guiding groove 40 is in this embodiment open towards the inner area of the groove member 28. The set of locking grooves 22 are provided close to each other with a relatively small gap between entrances of adjacent locking grooves, as seen from the guiding groove 40, for facilitating the receipt of the locking protrusion 30.

As an example, when the locking member 20 is located as illustrated in FIG. 4b, the arm 14 may be rotated in relation to the groove member 28 and thus to the base 16 from a first position to a second position. In the second position, the locking member 20 may again be displaced by adjustment of the screw 32, whereby the locking protrusion 30 is displaced radially outwards from the rotational axis 18 and received in a second locking groove in the set of locking grooves 22. The second locking groove may be another than the locking groove 22a of FIG. 4b. Different rotational positions of the arm 14 in relation to the base 16 may thus be fixed in view of rotational movement.

Secondly, the locking of the attachment part 12 in relation to the arm 14 will now be disclosed. Returning to FIG. 3, it can be seen that abutting surface portions of the wedge member 23 and of the locking member 20 are inclined in a corresponding manner. Specifically, the abutting surface portions are inclined such that the wedge member 23 is forced upwards towards the ball 24 in response to the displacement of the locking member 20 towards the housing. By that the wedge member 23 is forced towards the ball 24, and by the construction of the ball socket, the ball 24 is clamped between the wedge member 23 and the housing. Thus, any movement of the ball 24, and thus of the attachment part 12, is locked. The ball 24 can neither rotate nor tilt in relation to the arm 14 when the mounting assembly 10 is arranged in this mode.

It is realized that the inclined surface portions of the wedge member 23 and the locking member 20 do not need to abut. The desired function of forcing the wedge member 23 so as to clamp the joint member may be achieved by other constructions as well. For example, an intermediate member between the wedge member 23 and the locking member 20 may be provided. Alternative configurations are apparent for the skilled person.

By the disclosed construction of the mounting assembly 10, both the movement of the attachment part 12 in relation to the arm 14, and the movement of the arm 14 in relation to the base 16 may be locked by a single locking adjustment, that is the adjustment of the screw 33 for displacing the locking member 20 relative the housing. Correspondingly, movement of the parts of the mounting assembly 10 may be enabled by a single unlocking adjustment wherein the locking member 20 is displaced the reverse direction.

Figure 5:
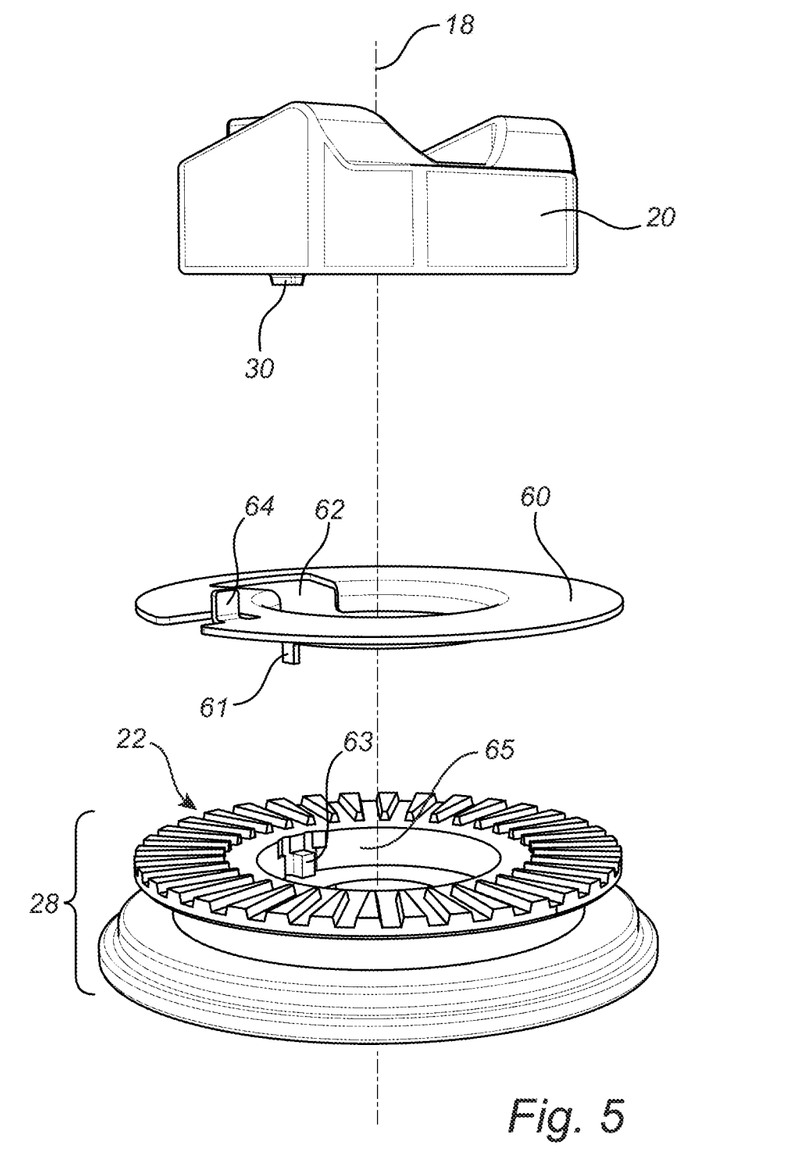
FIG. 5 illustrates a configuration of a locking member, a set of locking grooves, and a rotation stop member.

FIG. 5 illustrates parts of the mounting assembly of FIG. 2.

In order to limit the rotational movement of the locking member 20, and thus the arm, in relation to the groove member 28, and thus the base, the rotation stop member 60 is provided between the locking member 20 and the groove member 28. The rotation stop member 60 has the overall shape of a plate. A first protrusion 64 is provided for operatively connecting the rotation stop member 60 to the locking member 20 such that the rotation stop member 60 rotates together with the locking member 20. The first protrusion 64 may be received in an opening or groove provided in the surface (of the locking member 20) facing the rotation stop member 60. A second protrusion 61 is arranged to protrude and run along an inner surface 65 of the groove member 28. A stop element 63 is provided along the inner surface 65 of the groove member 28 and arranged to prevent the second protrusion 61 from passing during rotation. By this construction, the rotation stop member 60, and thus the locking member 20, cannot rotate infinitely. This function protects a cable, which may be provided through the construction, from twisting beyond function.

A gap 62 is provided on the rotation stop member 60 for allowing the locking protrusion 30 to reach the groove member 28 and in particular the set of locking grooves 22. The gap 62 is designed to be larger in cross-section than the locking protrusion 30 for providing flexibility in the rotational movement of the locking member 20 in relation to the rotation stop member 60. The locking member 20 is thereby allowed to rotate a bit further, corresponding to a distance set by the dimension of the gap 62 in relation to the dimension of the locking protrusion 30, when the second protrusion 61 meets the stop element 63 and is prevented from further rotation. This construction allows the locking member 20 to rotate in a rotational range of a bit more than a full turn, i.e. slightly more than 360 degrees.

Different materials may be used for the parts of the mounting assembly 10. In particular, it may be advantageous that at least the locking member 20, the adjustment member being exemplified as a screw 32, and the groove member 28 are made in metal. A conductive path may thereby be achieved running from the screw 33, through the locking member 20, and to the groove member 28. The locking member 20 and the adjustment member may then easily be grounded, which is an advantage for fulfilling device regulations such as EMC, EMS or ECD regulations.

In an alternative embodiment of the mounting assembly, the locking member may be provided with more than one locking protrusion. The locking member may be provided with a (first) locking protrusion in accordance with above disclosed embodiments, and further with an additional (second) locking protrusion. The groove member is in such an embodiment provided with a plurality of sets of locking grooves. The groove member may be provided with a (first) set of locking grooves in accordance with above disclosed embodiments, and further with an additional (second) set of locking grooves. The locking member may thus be provided with a first locking protrusion and a second locking protrusion. The first and second locking protrusions may be aligned and located radially at different distances from the rotational axis of the arm. The locking protrusions may be provided on a surface facing the groove member and in particular facing the plurality of sets of locking grooves thereof. The locking mechanism of the arm in relation to the base follows the same principle as in the above disclosed embodiments. When the locking member is displaced in relation to a housing of the arm, by adjustment of e.g. a screw, the locking protrusions are radially displaced in view of the rotational axis of the arm. Each of the locking protrusions is received in one locking groove in the respective set of locking grooves. When the locking protrusions are received in the locking grooves, the locking member, and thus the arm, is fixed in view of rotation movement and in relation to the groove member, and thus the base. By utilizing a plurality of locking protrusions, each being arranged to be received in a locking groove, the construction may become more resistant against rotational forces. This exemplified construction may be beneficial for mounting assemblies of larger dimensions.

It should be noted that the terms attachment part 12, arm 14, and base 16 are provided for facilitating the understanding of the description of the different embodiments of the mounting assembly. The construction of the claimed mounting assembly is however not dependant on the use of this division of its parts (attachment part, arm, base) and the components (e.g. locking member, wedge member, joint member, groove member) that are disclosed as being comprised in each part. It should thus be realized that many different configurations of the mounting assembly are possible within the scope of the claims and are apparent for the skilled person to achieve.

It is noted that the locking construction of the mounting assembly as exemplified above may be constructed in a reverse manner wherein the base comprises locking member and the arm comprises the groove member with the set of locking grooves.

The person skilled in the art realizes that the present invention by no means is limited to the preferred embodiments described above. On the contrary, many modifications and variations are possible within the scope of the appended claims. For example, the coupling between the attachment part and the arm may be achieved by alternative constructions to the ones exemplified above. The coupling could be provided for allowing the attachment part to tilt relative the arm without allowing rotational movement. Even though it is currently preferred to locate the locking protrusion on a surface of the locking member facing the base, the mounting assembly may be designed with a locking protrusion provided on a side surface of the locking member. A combination of these examples may also be feasible.

The invention claimed is:

1. A mounting assembly for an electronic device, the mounting assembly comprising:
   an attachment part arranged to be attached to the electronic device;
   a base arranged to be attached to a mounting surface; and
   an arm via which the attachment part is connected to the base,
   wherein the attachment part is coupled to the arm such that the attachment part is lockingly tiltable relative the arm, and wherein the arm is coupled to the base such that the arm is lockingly rotatable relative the base about a rotational axis that is parallel with a longitudinal axis of the arm;
   wherein the arm comprises:
      a housing; and
      a locking member arranged inside the housing and being provided with a locking protrusion;
      wherein the locking member is coupled to the housing via an adjustment member such that the locking member is displaceable relative the housing, and such that the locking protrusion is radially displaceable in relation to the rotational axis, by adjusting said adjustment member;
   wherein the base is provided with a set of radially extending locking grooves in relation to the rotational axis; and
   wherein the mounting assembly is arranged such that the locking protrusion is received by one locking groove in the set of locking grooves in response to a displacement of the locking member, and thus a radial displacement of the locking protrusion, relative the housing, whereby the arm is rotationally locked in relation to the base.

2. The mounting assembly according to claim 1, wherein the locking protrusion is provided on a surface of the locking member facing the base.

3. The mounting assembly according to claim 1, wherein the set of locking grooves of the base is arranged as a circular array of radially extending grooves.

4. The mounting assembly according to claim 1, wherein the set of locking grooves is connected by a guiding groove arranged to receive the locking protrusion.

5. The mounting assembly according to claim 1, wherein the mounting assembly is arranged such that a joint member of the attachment part is positionally locked in relation to the arm in response to the displacement of the locking member relative the housing.

6. The mounting assembly according to claim 5,
   wherein the mounting assembly is arranged such that the joint member is positionally locked relative the arm by clamping the joint member between a wedge member and the housing of the arm, the wedge member being arranged inside the housing; and
   wherein abutting surface portions of the locking member and of the wedge member are inclined such that the wedge member is forced towards the joint member in response to the displacement of the locking member relative the housing for clamping the joint member.

7. The mounting assembly according to claim 1, wherein the attachment part is coupled to the arm such that the attachment part is also lockingly rotatable relative the arm.

8. The mounting assembly according to claim 1, wherein the attachment part is coupled to the arm via a ball joint.

9. The mounting assembly according to claim 1, wherein the radial displacement of the locking protrusion is a radial outwards displacement in relation to the rotational axis.

10. The mounting assembly according to claim 1, wherein the adjustment member is a screw being accessible from outside the housing for adjustment.

11. The mounting assembly according to claim 1,
   wherein the locking member is provided with an additional locking protrusion,
   wherein the locking member is coupled to the housing via the adjustment member such that the locking member is displaceable relative the housing, and such that the additional locking protrusion is radially displaceable in relation to the rotational axis, by adjusting said adjustment member;
   wherein the base is provided with an additional set of radially extending locking grooves in relation to the rotational axis; and
   wherein the mounting assembly is arranged such that the additional locking protrusion is received by one additional locking groove in the additional the set of locking grooves in response to a displacement of the locking member, and thus a radial displacement of the additional locking protrusion, relative the housing.

12. The mounting assembly according to claim 1, wherein the locking member is made of a conductive material such as metal.

13. The mounting assembly according to claim 1, wherein the attachment part is lockingly tiltable relative the arm in a range of about 90 degrees.

14. The mounting assembly according to claim 1, wherein the electronic device is a monitoring camera, a thermal sensor, a door station, or a speaker.

15. A system comprising an electronic device and a mounting assembly according to claim 1.

* * * * *